United States Patent [19]

Takada et al.

[11] Patent Number: 6,000,912
[45] Date of Patent: *Dec. 14, 1999

[54] METHOD OF LIQUID-COOLING AN INVERTER DEVICE

[75] Inventors: Tsutomu Takada; Susumu Shimizu, both of Yokohama; Hitoshi Kawaguchi, Fujisawa, all of Japan

[73] Assignee: Ebara Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,986

[22] Filed: Oct. 7, 1996

[30] Foreign Application Priority Data

Oct. 9, 1995 [JP] Japan .................................. 7-287974

[51] Int. Cl.⁶ .................................................. F04B 49/10
[52] U.S. Cl. ................................................ 417/32; 417/53
[58] Field of Search ...................... 417/32, 53; 165/80.4, 165/104.33; 257/722, 714; 361/699, 709; 363/141

[56] References Cited

U.S. PATENT DOCUMENTS

| | | |
|---|---|---|
| 3,656,540 | 4/1972 | Henrici .................................. 165/1 |
| 3,807,489 | 4/1974 | Minbiole et al. .......................... 165/1 |
| 4,709,560 | 12/1987 | Voorhis et al. .......................... 62/508 |
| 4,834,624 | 5/1989 | Jensen et al. . |
| 5,052,472 | 10/1991 | Takahashi et al. ........................ 165/1 |
| 5,177,972 | 1/1993 | Sillato et al. ............................ 62/205 |
| 5,484,012 | 1/1996 | Hiratsuka ................................. 165/40 |
| 5,531,285 | 7/1996 | Green ................................... 180/65.2 |

FOREIGN PATENT DOCUMENTS 4-364379  12/1992  Japan .

OTHER PUBLICATIONS

European Patent Office Communication with European Search Report for European Patent Application No. 96116164.3 dated Feb. 10, 1997.

*Primary Examiner*—Xuan M. Thai
*Attorney, Agent, or Firm*—Armstrong, Westerman, Hattori McLeland and Naughton

[57] ABSTRACT

An inverter device mounted on a heat sink for controlling a pump is cooled with a cooling liquid which is typically water discharged by the pump. The rate of flow of the cooling liquid supplied to the heat sink is regulated by a flow regulating mechanism based on the temperature of the heat sink detected by a temperature detecting device, for thereby keeping the temperature of the heat sink in a predetermined range. The heat sink supplied with the cooling liquid which is thus regulated by the flow regulating mechanism prevents the inverter device and wires connected thereto from being overly cooled and hence from suffering moisture condensation.

5 Claims, 18 Drawing Sheets

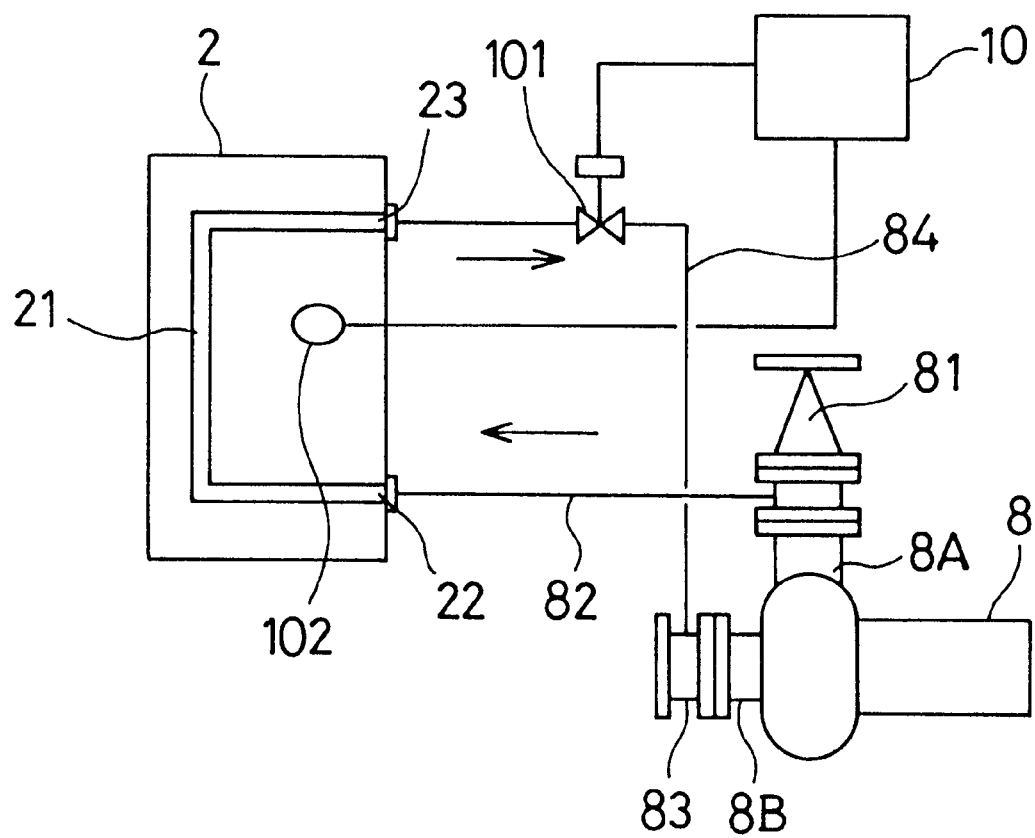
F I G. 9.

METHOD OF LIQUID-COOLING AN INVERTER DEVICE

BACKGROUND OF THE INVENTION

1. Field of the Invention

The present invention relates to a method of liquid-cooling an inverter device with a liquid-cooling mechanism in a control box which controls the rotational speed of a pump or the like with the inverter device.

2. Description of the Prior Art

FIGS. 1A and 1B of the accompanying drawings show a conventional control box for controlling the rotational speed of a pump with an inverter device. As shown in FIGS. 1A and 1B, the control box has an inverter device 1, a protective device 5, such as a ground fault interrupter, and a control device 6, such as auxiliary relays which are housed in a console case 3 mounted on a console chassis 4.

The console chassis 4 has a plurality of holes 8 defined therein for passage of electric power cables therethrough. A heat sink 12 is mounted on an outer surface of the console chassis 4. The inverter device 1, which is a heat source, is mechanically coupled to the heat sink 12 that radiates the heat generated by the inverter device 1 through fins of the heat sink 12 into the atmosphere. Therefore, the inverter device 1 housed in the console case 3 is air-cooled through the heat sink 12.

As the output power of the air-cooled inverter device 1 becomes higher, the inverter device 1 radiates a larger amount of heat and requires the heat sink 12 to be larger in size. Since the inverter device 1 is actually relatively small in size, the installation area in which the inverter device 1 is attached to the heat sink 12 is small as compared to the output power of the inverter device 1, as can be seen from the proportion of the size of the inverter device 1 to the size of the heat sink 12 in FIGS. 1A and 1B.

With the size proportion shown in FIGS. 1A and 1B, the heat generated by the inverter device 1 cannot uniformly be transferred to the entire surface of the heat sink 12, and hence cannot sufficiently be dissipated from the heat sink 12, resulting in an undue increase in the temperature of the inverter device 1.

For fully dissipating the heat produced by an inverter device, the inverter device may be water-cooled by a water-cooling heat sink. FIGS. 2A and 2B of the accompanying drawings show a control box having a water-cooling heat sink 2. The control box shown in FIGS. 2A and 2B is essentially similar to the control box shown in FIGS. 1A and 1B except for the water-cooling heat sink 2 which is mounted on an outer surface of the console chassis 4.

The heat generated by the inverter device 1 is radiated into the atmosphere through cooling water which flows in the water-cooling heat sink 2. Specifically, the water-cooling heat sink 2 has a cooling pipe 21 disposed therein and having an inlet port 22 and an outlet port 23. The cooling water is introduced through the inlet port 22 into the cooling pipe 21 and discharged from the cooling pipe 21 through the outlet port 23. A protective device 5 and a control device 6 are also housed in a console case 3.

The water-cooling heat sink 2 is smaller in size than the air-cooling heat sink 12 shown in FIGS. 1A and 1B. However, the relatively small water-cooling heat sink 2 is capable of sufficiently discharging the heat from the inverter device 1 into the atmosphere around the control box.

If the temperature of the water-cooling heat sink 2 is lower than the temperature of air in the control box or the temperature of the atmospheric air, then the moisture present in and around the control box is condensed into dew that tends to corrode the console chassis 4 and also adversely affects the electric components in the control box. If the water-cooling heat sink 2 is directly installed on the console chassis 4, then the heat of the water-cooling heat sink 2 is transferred to the console chassis 4. Therefore, when the temperature of the water-cooling heat sink 2 is lower than the temperature of air in the control box or the temperature of the atmospheric air, the moisture present in and around the control box is condensed into dew on the inner and outer surfaces of the console chassis 4.

FIGS. 3A and 3B of the accompanying drawings show control box structures for preventing moisture condensation on a control box chassis. In FIG. 3A, a water-cooling heat sink 2 is spaced from a console chassis 4 by a spacer 9 and connected to the console chassis 4 by a bolt 7 spaced from the spacer 9. In FIG. 3B, a water-cooling heat sink 2 is spaced from a console chassis 4 by a spacer 9 and connected to the console chassis 4 by a bolt 7 extending through the spacer 9. In each of the structures shown in FIGS. 3A and 3B, a heat source, such as an inverter device, is connected to the water-cooling heat sink 2 to transmit the heat generated by the heat source to the water-cooling heat sink 2, which transfers the heat out of the control box. Since the water-cooling heat sink 2 is positioned outside of the control box with a space left between the console chassis 4 and the water-cooling heat sink 2, the heat of the water-cooling heat sink 2 is essentially not transferred to the console chassis 4. As a result, no moisture condensation takes place on the inner and outer surfaces of the console chassis 4. Even when moisture is condensed on the water-cooling heat sink 2, the condensed water does not find its way into the control box.

However, the structures shown in FIGS. 3A and 3B are not addressed to the problem of how to remove dew produced upon moisture condensation on the surface of the water-cooling heat sink 2 and also the problem of moisture condensation on the inverter device mounted on the water-cooling heat sink 2 and connecting portions of wires and cables connected to the inverter device.

The mechanical structure of a general inverter device which is housed in a control box is shown in FIGS. 4A and 4B of the accompanying drawings. As shown in FIGS. 4A and 4B, the inverter device has a frame assembly comprising a resin frame 113 extending around a copper plate 115. The frame assembly supports a base board 114 encapsulated by a resin mold 116. The base board 114 supports thereon various electronic components required to control the inverter device and power semiconductor devices for the inverter device. Those electronic components include a control power supply capacitor 110, a control power supply transformer 111, and a control CPU 112 which are mounted on the base board 114 and wholly or partly exposed for heat radiation. Power supply terminals 120 are also exposed on the base board 114. The inverter device also includes an intermediate voltage board 117 supporting capacitors 119. The intermediate voltage board 117 is fastened to the base board 114 by screws 118.

FIG. 5 of the accompanying drawings shows the control power supply capacitor 110 which is mounted on the base board 114. As shown in FIG. 5, capacitor attachment terminals 121 connected to the control power supply capacitor 110 are attached to the base board 114 and partly encapsulated by the resin mold 116. Inasmuch as the capacitor attachment terminals 121 cannot be fully encapsulated by the resin mold 116 in order to radiate the heat from the control power supply capacitor 110, upper portions of the capacitor attachment terminals 121 are exposed.

FIG. 6 of the accompanying drawings illustrates the control CPU 112 which is mounted on the base board 114. As shown in FIG. 6, the control CPU 112 is partly encapsulated by the resin mold 116. The control CPU 112 has control CPU terminals 125 connected to the base board 114. Since the control CPU 112 generates heat, it is fully covered with a copper plate 115 for heat radiation.

FIGS. 7A and 7B of the accompanying drawings show the power supply terminals 120 in detail. As shown in FIGS. 7A and 7B, a terminal attachment bar 124 is directly mounted on the base board 114 and has a plurality of screw holes defined in an upper surface thereof. The power supply terminals 120, which are of the pressure type, are attached to the terminal attachment bar 124 by respective screws 123 that are threaded into the respective screw holes. The terminal attachment bar 124 has partition walls 122, and integrally molded with the resin frame 113 for separating the power supply terminals 120 from each other. Power supply wires 126 are connected to the respective power supply terminals 120.

When the temperature of the cooling water supplied to the water-cooling heat sink is low, the temperature of the copper plate 115 shown in FIG. 4 is close to the temperature of the surface of the heat sink, i.e., the temperature of the cooling water flowing through the heat sink. Since the resin mold 116 is cooled to the temperature of the copper plate 115, the temperature of the base board 114 is also close to the temperature of the cooling water. The control power supply capacitor 110 is cooled to an overly cooled condition through the capacitor attachment terminals 121 which are connected to the base board 114. Similarly, as shown in FIG. 6, the control CPU 112 is cooled to an overly cooled condition through the control CPU terminals 125 which are connected to the base board 114. Moreover, as shown in FIGS. 7A and 7B, the power supply terminals 120 are cooled to an overly cooled condition through the screws 123 and the terminal attachment bar 124 which is connected to the base board 114.

As described above, when the temperature of the cooling water supplied to the water-cooling heat sink is low, the cooling water has its cooling effect on the various electronic components of the inverter device. As a result, the various electronic components are cooled. If the surface temperature of the various electronic components or wires connected thereto becomes lower than the dew point, then moisture is condensed on and around the electronic components, tending to impair the insulating capability thereof or produce a short circuit between the electronic components or in the power supply system. Such an insulation failure or short circuit may possibly lead to a serious accident.

Specifically, in FIG. 5, the moisture is condensed on and around the control power supply capacitor 110, producing dew which drops onto the capacitor attachment terminals 121 thereby to cause a short circuit between the capacitor attachment terminals 121.

In FIG. 6, the moisture is condensed on and around the heat-radiating copper plate of the control CPU 112, producing dew which drops onto and spreads over the resin mold 116. The spread dew causes a short circuit between pins of nearby connectors, which results in a malfunction of the control CPU 112.

In FIGS. 7A and 7B, the moisture is condensed on and around the screws 123 and the terminal attachment bar 124, producing dew which is gathered on the partition walls 122 thereby to bring about a short circuit in the power supply system. Because the wires 126 connected to the power supply terminals 120 are heat conductors, the wires 126 themselves are cooled, resulting in a degradation of the insulation of the wires 126.

If part of a liquid that is delivered under pressure by the pump whose rotational speed is controlled by the inverter device is used as the cooling water, then it is difficult to control the temperature of the cooling water because the pump can handle a wide range of alternative liquids which have a wide temperature range. Unless the temperature of the cooling water is strictly controlled, however, the inverter device may possibly suffer a serious accident due to moisture condensation as described above. For example, if the pump handles tapped water, then it has different temperatures in summer and winter. If the pump handles groundwater, then its temperature is very low even in summer, and it is likely to overly cool the inverter device.

In reality, therefore, almost all inverter devices used for the control of general pumps are air-cooled either through radiation or by a fan.

As described above, the water-cooling heat sink can reliably discharge the heat generated by the power semiconductor devices, but may possibly overly cool the electronic components and/or conductors or wires connected thereto. Therefore, the water-cooling heat sink requires that the temperature of the cooling water be controlled so as not cause moisture condensation, and be determined in view of the ambient temperature and/or humidity. While the temperature of the cooling water can be controlled if the cooling water is supplied from an external source, it is almost impossible to control temperature of the cooling water if it is part of a liquid that is handled by the pump controlled by the inverter device itself.

FIG. 8 of the accompanying drawings shows a liquid-cooling mechanism for cooling an inverter device with a liquid which is handled by a pump whose rotational speed is controlled by the inverter device. As shown in FIG. 8, a pump 8 has an outlet port which is connected to a check valve 81. Part of a liquid that is discharged by the pump 8 is introduced from between the outlet port and a primary side of the check valve 81 through a conduit 82 to an inlet port 22 of a pipe 21 which extends through a heat sink 2. The liquid which flows through the pipe 21 is then discharged from the water-cooling heat sink 2 through an outlet port 23 of the pipe 21, and returns through a return pipe 84 to a short pipe 83 which is connected to a suction port of the pump 8.

SUMMARY OF THE INVENTION

It is therefore an object of the present invention to provide a method of liquid-cooling an inverter device with a liquid-cooling mechanism in a control box while preventing the inverter device and wires connected thereto from being overly cooled and causing moisture condensation.

To achieve the above object, there is provided in accordance with the present invention a method of cooling an inverter device mounted on a heat sink with a cooling liquid, comprising the step of regulating the rate of flow of the cooling liquid supplied to the heat sink with a flow regulating mechanism based on the temperature of the heat sink detected by a temperature detecting device, for thereby keeping the temperature of the heat sink in a predetermined range.

The temperature detecting device may comprise a temperature sensor mounted on the heat sink, and the flow regulating mechanism may comprise a solenoid-operated valve which is selectively openable and closable based on the temperature of the heat sink detected by the temperature sensor.

Alternatively, the temperature detecting device may comprise a heat sensitive unit which stores a substance contractable and expandable with heat, the heat sensitive unit being mounted on the heat sink, and the flow regulating mechanism may comprise a temperature regulating valve which is selectively openable and closable based on the contraction and expansion of the substance.

Further alternatively, the temperature detecting device may comprise a heat sensitive unit which stores a substance contractable and expandable with heat, the heat sensitive unit being disposed in a flow passage of the cooling liquid which is connected to the heat sink, and the flow regulating mechanism may comprise a temperature regulating valve which is selectively openable and closable based on the contraction and expansion of the substance.

The cooling liquid may be discharged by a pump which is controlled by the inverter device, and the method may further comprise the steps of supplying part of the cooling liquid discharged by the pump from a junction between an outlet port of the pump and a check valve connected thereto, to the heat sink, and returning the cooling liquid from the heat sink to the pump.

The flow regulating mechanism may be openable at a first temperature and closable at a second temperature, the first temperature being greater than the second temperature, and the second temperature being greater than the temperature of atmospheric air or the temperature of an atmosphere in which the heat sink is located.

Alternatively, the flow regulating mechanism may be openable at a first temperature and closable at a second temperature, the first temperature being greater than the temperature of atmospheric air or the temperature of an atmosphere in which the heat sink is located, and the temperature of atmospheric air or the temperature of an atmosphere in which the heat sink is located being greater than the second temperature.

Further alternatively, the flow regulating mechanism may be openable at a first temperature and closable at a second temperature, the first temperature being greater than the second temperature, and the second temperature being greater than the dew point with an allowable moisture at the temperature of atmospheric air or the temperature of an atmosphere in which the heat sink is located.

According to the present invention, there is also provided a method of cooling an inverter device mounted on a heat sink with a cooling liquid discharged by a plurality of pumps controlled by the inverter device, comprising the step of regulating the rate of flow of the cooling liquid supplied from a common passage connected to outlet ports of the pumps to the heat sink with a flow regulating mechanism which is opened only when the temperature of the heat sink is higher than a preset temperature and the pumps are operating, and is closed only when the temperature of the heat sink is lower than the preset temperature or the pumps are inactivated.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a schematic view of a liquid-cooling mechanism for cooling an inverter device, which carries out a method according to a first embodiment of the present invention;

DETAILED DESCRIPTION OF THE PREFERRED EMBODIMENTS

Figure 1A:
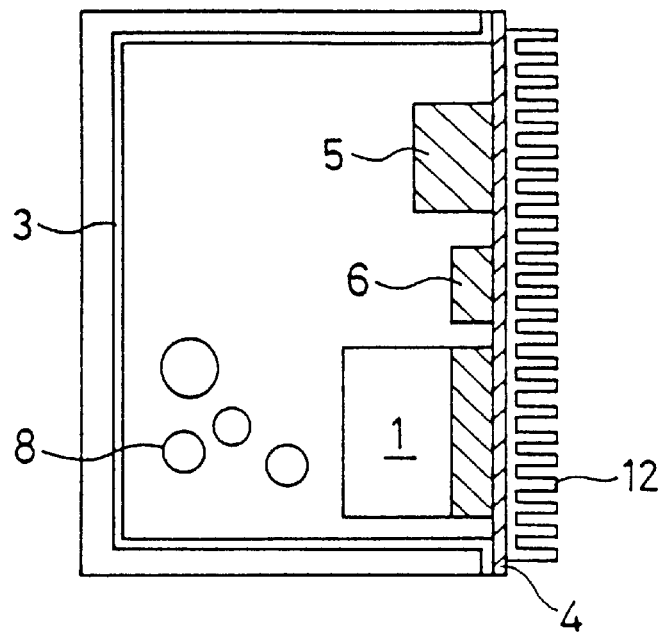
FIG. 1A is a horizontal cross-sectional view of a conventional control box.
Figure 1B:
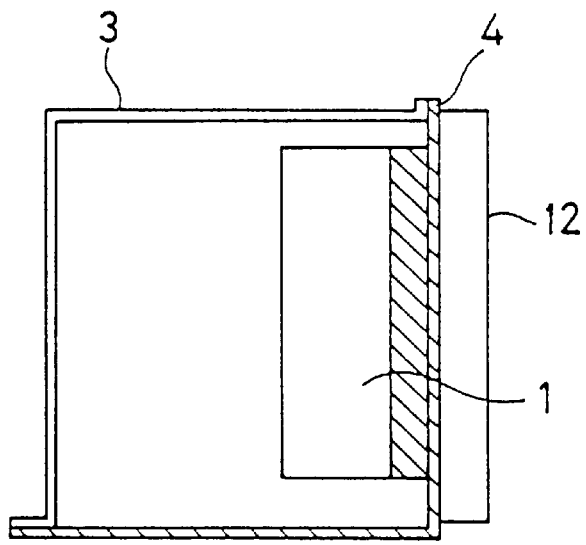
FIG. 1B is a vertical cross-sectional view of the conventional control box shown in FIG. 1A.
Figure 2A:
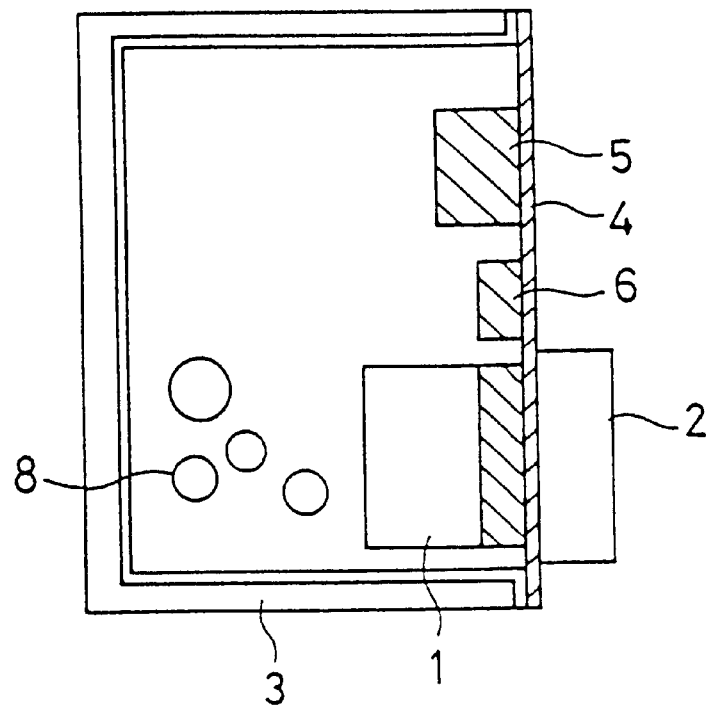
FIG. 2A is a horizontal cross-sectional view of water-cooling control box.
Figure 2B:
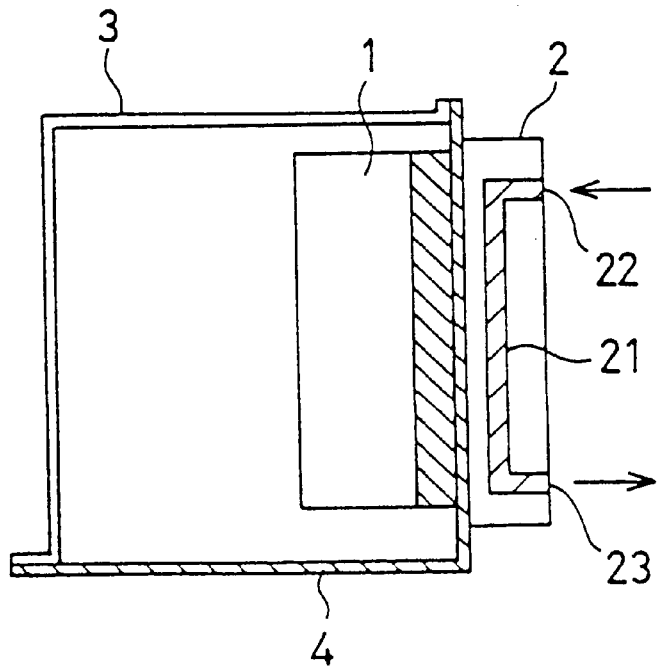
FIG. 2B is a vertical cross-sectional view of the water-cooling control box shown in FIG. 2A.
Figure 3A:
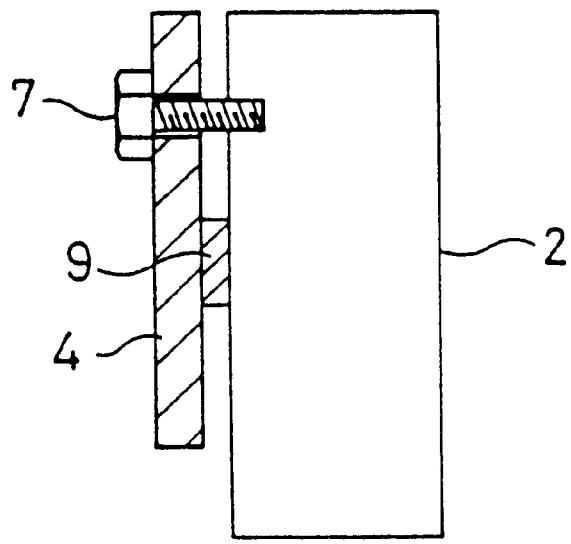
FIG. 3A is a vertical cross-sectional view of an improved control box.
Figure 3B:
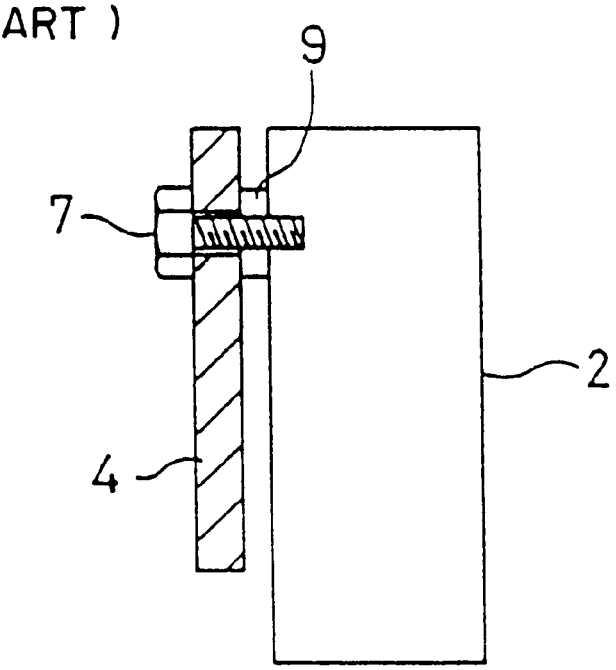
FIG. 3B is a vertical cross-sectional view of another improved control box.
Figure 4A:
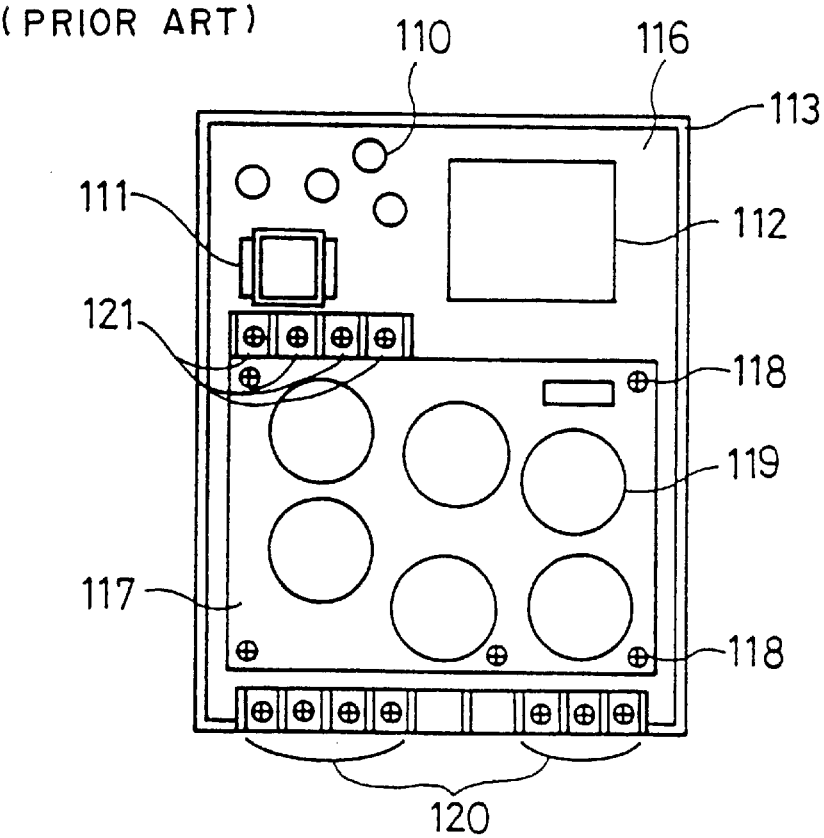
FIG. 4A is a front elevational view of an inverter device.
Figure 4B:
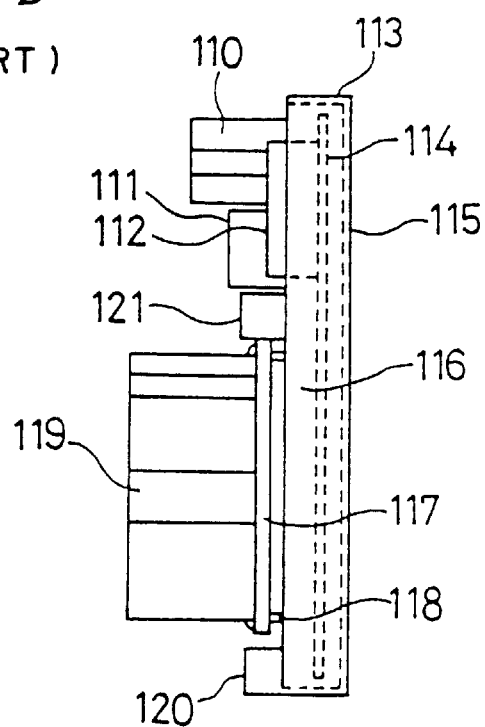
FIG. 4B is a side elevational view of the inverter device shown in FIG. 4A.
Figure 5:
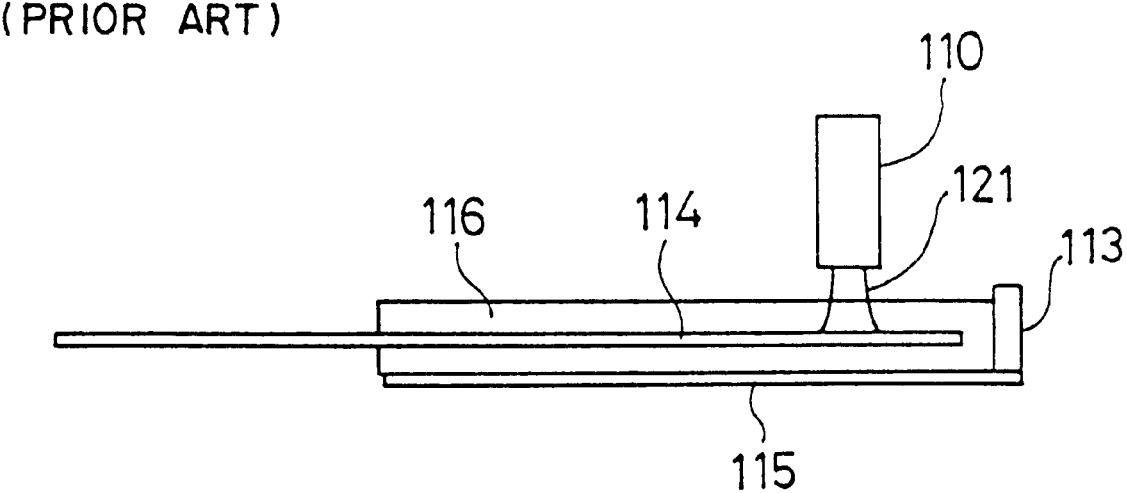
FIG. 5 is a side elevational view of a control power supply capacitor which is mounted of a base board in the inverter device shown in FIG. 4A.
Figure 6:
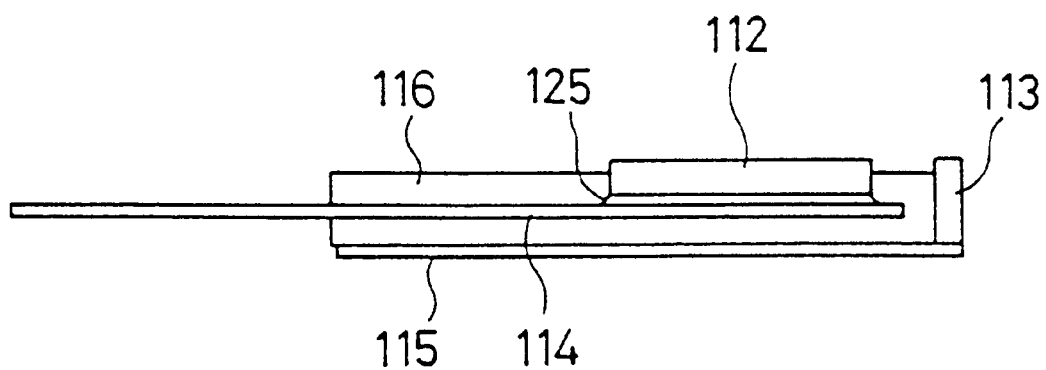
FIG. 6 is a side elevational View of a control CPU which is mounted on the base board of the inverter device shown in FIG. 4A.
Figure 7A:
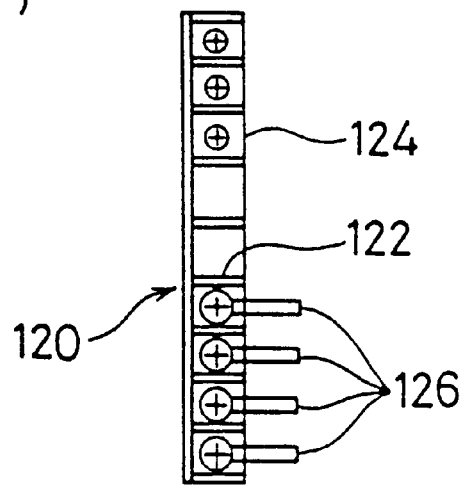
FIG. 7A is a plan view of power supply terminals of the inverter device shown in FIG. 4A.
Figure 7B:
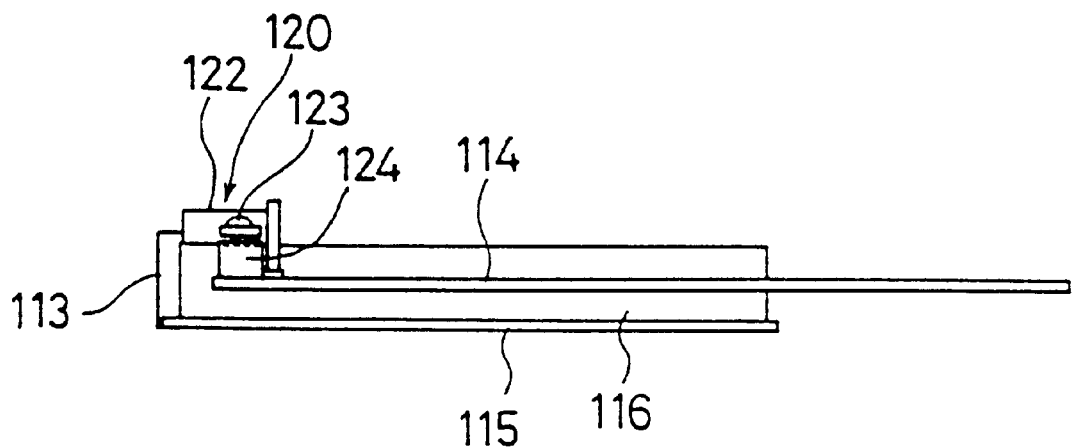
FIG. 7B is a side elevational view of the power supply terminals which are mounted on the base board of the inverter device shown in FIG. 4A.
Figure 8:
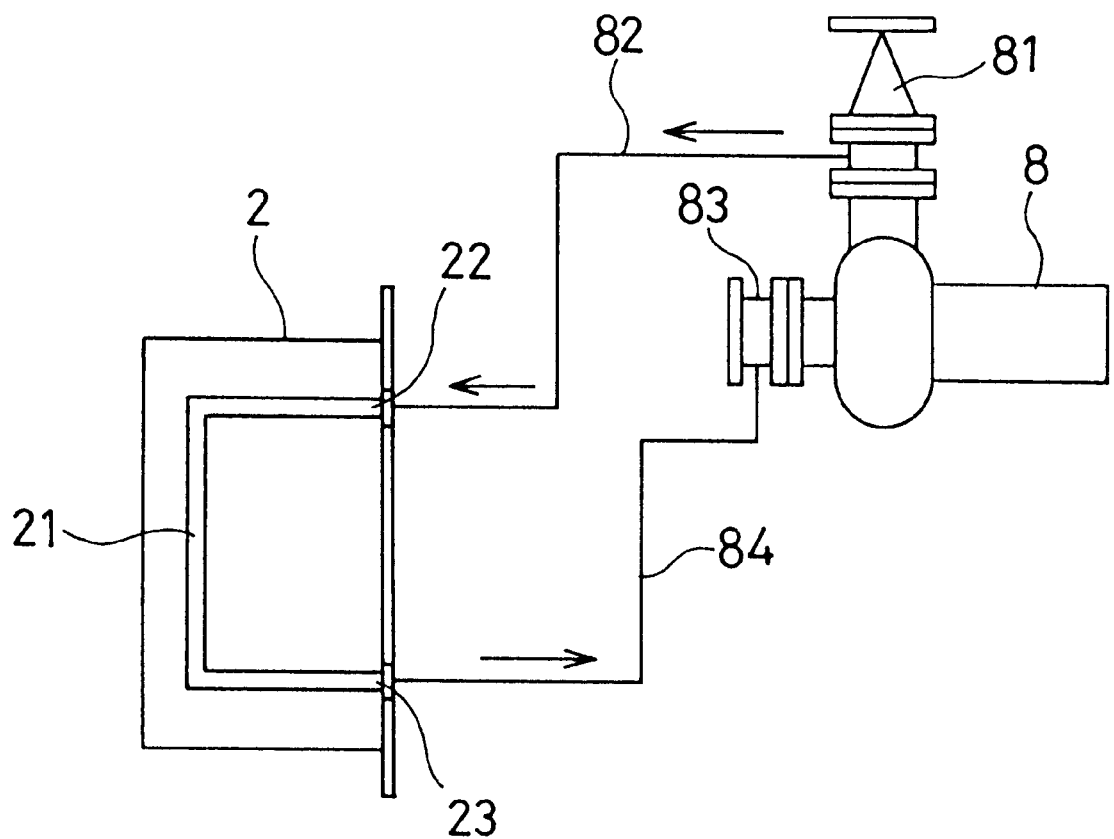
FIG. 8 is a schematic view of a liquid-cooling mechanism for cooling an inverter device with a liquid which is handled by a pump whose rotational speed is controlled by the inverter device.

FIG. 9 schematically shows a liquid-cooling mechanism for cooling an inverter device, which carries out a method according to a first embodiment of the present invention.

As shown in FIG. 9, a heat sink 2 has a cooling pipe 21 extending therethrough and having an inlet port 22 and an outlet port 23. An inverter device (not shown), which serves as a heat source, is fixedly mounted on the heat sink 2. A pump 8 has an outlet port 8A which is connected to a check valve 81. Part of a liquid that is discharged by the pump 8 is introduced, as a cooling liquid, from between the outlet port 8A and a primary side of the check valve 81 through a conduit 82 to the inlet port 22 of the cooling pipe 21. The liquid which flows through the pipe 21 is then discharged from the heat sink 2 through the outlet port 23 of the pipe 21, and returns through a return pipe 84 to a short pipe 83 which is connected to a suction port 8B of the pump 8.

A solenoid-operated valve 101 is disposed in the return pipe 84 for controlling the flow of the liquid in the return pipe 84. The solenoid-operated valve 101 can selectively be opened and closed by a control box 10 based on the temperature of the heat sink 2 which is detected by a temperature sensor 102 attached to the heat sink 2.

Figure 10:
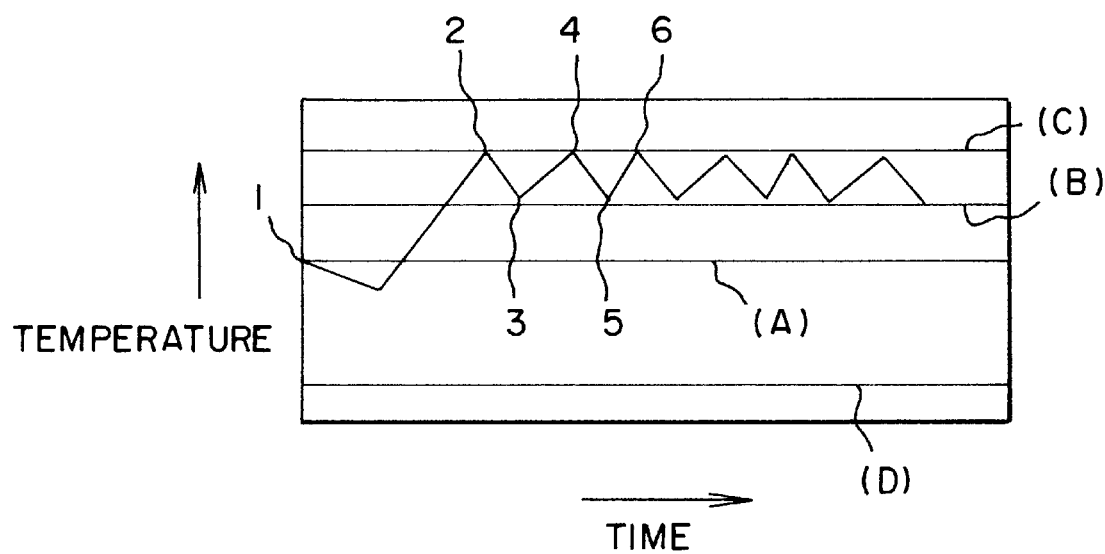
FIG. 10 is a diagram showing a temperature pattern in which the temperature of a heat sink varies with time in response to operation of a solenoid-operated valve of the liquid-cooling mechanism shown in FIG. 9.

FIG. 10 shows a temperature pattern in which the temperature of the heat sink 2 varies with time in response to operation of the solenoid-operated valve 101. The graph shown in FIG. 10 has a horizontal axis representing time and a vertical axis representing temperature. In FIG. 10, the line (D) indicates the temperature of the liquid supplied to cool the heat sink 2, i.e., the liquid delivered by the pump 8, the line (A) the temperature of the atmospheric air or the temperature of the atmosphere in which the heat sink 2 is located, the line (B) the temperature at which the solenoid-operated valve 101 is closed, and the line (C) the temperature at which the solenoid-operated valve 101 is opened.

When the pump 8 is operated, the heat generated by the inverter device starts being transferred to the heat sink 2 at a point ①. Since the solenoid-operated valve 101 is closed, the heat sink 2 absorbs the heat and its temperature increases with time. When the temperature of the heat sink 2 reaches the line (C) at a point ②, the temperature is detected by the temperature sensor 102, which sends a signal to the control box 10 to open the solenoid-operated valve 101.

When the solenoid-operated valve 101 is opened, the liquid discharged by the pump 8 begins to flow through the cooling pipe 21. The liquid flowing through the cooling pipe 21 absorbs the surrounding heat from the heat sink 2, whose temperature now starts to drop from the line (C) to the line (B). When the temperature of the heat sink 2 reaches the line (B) at a point ③, the temperature is detected by the temperature sensor 102, which sends a signal to the control box 10 to close the solenoid-operated valve 101. When the solenoid-operated valve 101 is closed, the liquid discharged by the pump 8 stops flowing through the cooling pipe 21. The heat of the heat sink 2 is not absorbed by the liquid, and the temperature of the heat sink 2 starts to rise. When the temperature to the heat sink 2 reaches the line (C) again at a point ④, the temperature is detected by the temperature sensor 102, and the control box 10 opens the solenoid-operated valve 101. Subsequently, the solenoid-operated valve 101 is closed at a point ⑤ and then opened at a point ⑥ in the same manner as described above. Accordingly, the temperature of the heat sink 2 is maintained in a range which is higher than the temperature of the atmospheric air or the temperature of the atmosphere in which the heat sink 2 is located. The temperature of the surface of the heat sink 2 is thus higher than the dew point, preventing moisture condensation on the heat sink 2 and the inverter device. The inverter device and hence their electronic components are prevented from being overly cooled. Since the liquid used to cool the inverter device may be used in a wide temperature range, a liquid having a relatively low temperature may be used in the liquid-cooling mechanism, and hence a liquid discharged from the pump may be used in the liquid-cooling mechanism.

Figure 11:
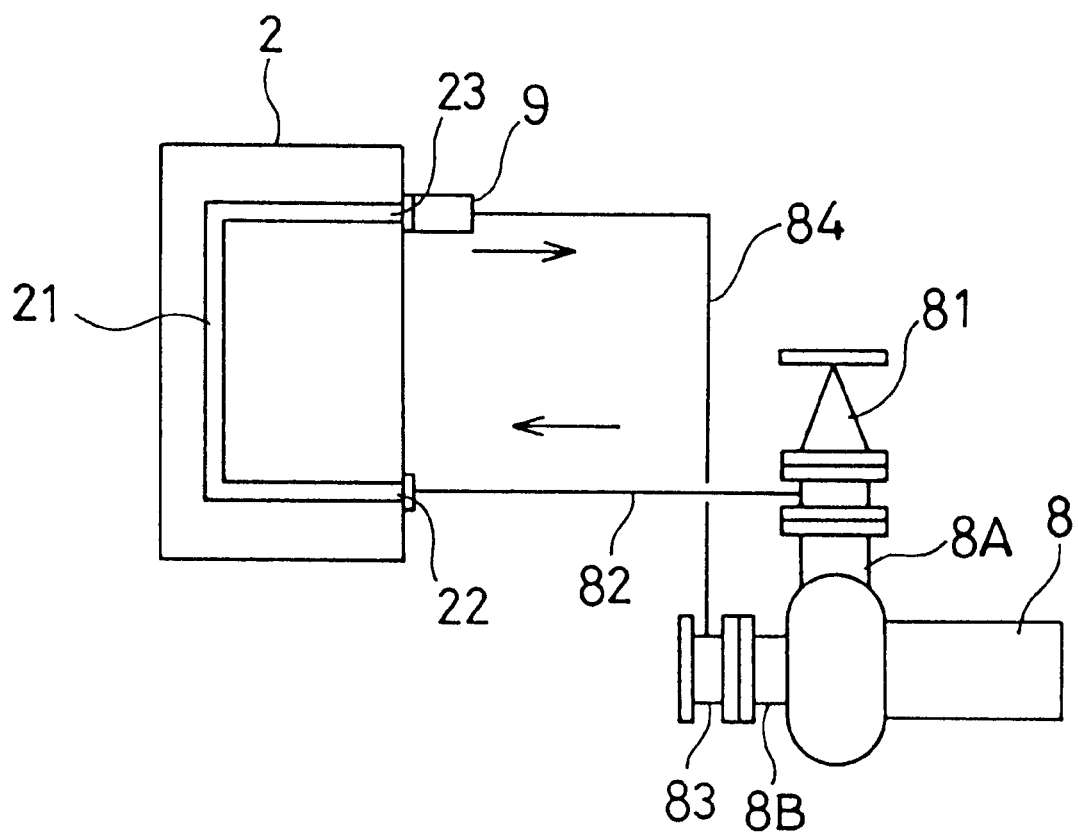
FIG. 11 is a schematic view of a liquid-cooling mechanism for cooling an inverter device, which carries out a method according to a second embodiment of the present invention.

FIG. 11 schematically shows a liquid-cooling mechanism for cooling an inverter device, which carries out a method according to a second embodiment of the present invention.

As shown in FIG. 11, a heat sink 2 has a cooling pipe 21 extending therethrough and having an inlet port 22 and an outlet port 23. An inverter device (not shown), which serves as a heat source, is fixedly mounted on the heat sink 2. A pump 8 has an outlet port 8A which is connected to a check valve 81. Part of a liquid that is discharged by the pump 8 is introduced, as a cooling liquid, from between the outlet port 8A and a primary side of the check valve 81 through a conduit 82 to the inlet port 22 of the cooling pipe 21. The liquid which flows through the pipe 21 is then discharged from the heat sink 2 through the outlet port 23 of the pipe 21, and returns through a return pipe 84 to a short pipe 83 which is connected to a suction port 8B of the pump 8. The above structure is the same as the corresponding structure shown in FIG. 9.

Figure 12A:
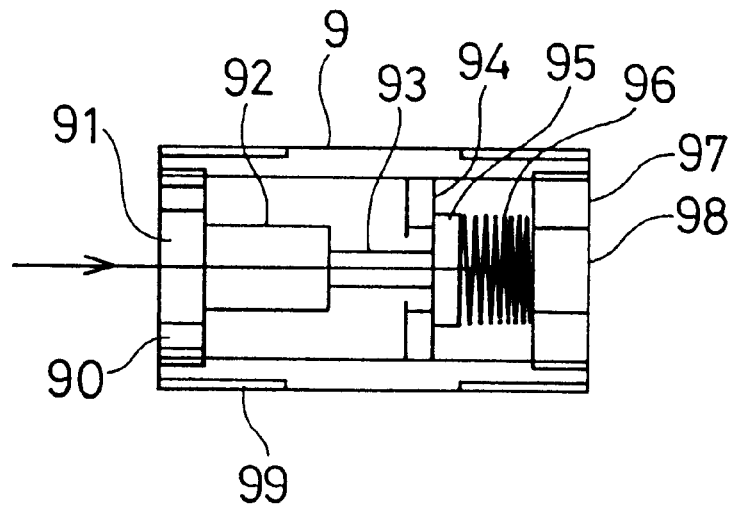
FIG. 12A is a cross-sectional view of a temperature control valve shown in FIG. 11 as it is closed.

A temperature regulating valve 9 is connected to the outlet port 23. The temperature regulating valve 9 can selectively be opened and closed in response to the temperature-dependent expansion of a wax disposed therein. Specifically, as shown in FIG. 12A, the temperature regulating valve 9 has a heat sensitive unit 92 disposed in a valve casing and filled with a wax that expands with heat. The heat sensitive unit 92 is mounted on a holder 91 which is threaded in one end of the valve casing. The holder 91 has a plurality of small holes 90 defined therein along its outer circumferential edge. When the temperature of the wax increases, it expands and pushes a spindle 93 connected to the heat sensitive unit 92. A valve body 95 is mounted on the distal end of the spindle 93 and is normally held against a valve seat 94 by a spring 96. The valve seat 94 has a central opening which is normally closed by the valve seat 94. The spring 96 has an end held against the valve body 95 and an opposite end held against a spring holder 97 which is threaded in the other end of the valve casing. The spring holder 97 has a central hole 98 defined therein. The valve casing has externally threaded ends 99 each for attachment to the heat sink 2.

In FIG. 12A, the temperature regulating valve 9 is shown as being closed when the wax is contracted and the valve body 95 is held against the valve seat 94 under the bias of the spring 96.

Figure 12B:
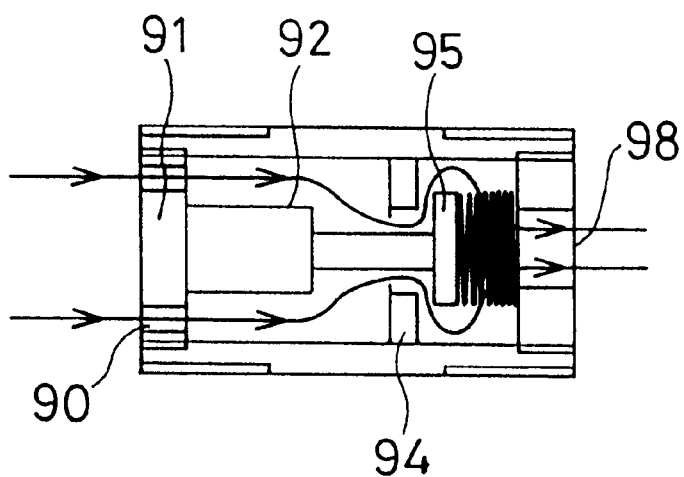
FIG. 12B is a cross-sectional view of the temperature control valve as it is open.

When the temperature of the wax increases, it expands and pushes the spindle 93 to lift the valve body 95 off the valve seat 94. Now, as shown in FIG. 12B, the liquid flows from the holes 90 in the holder 91 into the valve casing, through the central opening in the valve seat 94, and then out of the valve casing through the central hole 98 in the spring holder 97.

The temperature regulating valve 9 operates in the same manner as the solenoid-operated valve 101 to control the temperature of the heat sink 2 in the temperature pattern shown in FIG. 10. The temperature regulating valve 9 has the heat sensitive unit 92 and the valve body 95 integrally combined with each other as a unit, and hence is relatively compact and small. The temperature regulating valve 9 can directly detect the temperature of the heat sink 2 at the outlet port 23 thereof. Therefore, no separate temperature sensor is required. Furthermore, the temperature regulating valve 9 dispenses with any external control box such as the control box 10 shown in FIG. 9, and hence a power supply and associated wires which would otherwise be required by the solenoid-operated valve and the control box. Therefore, the liquid-cooling mechanism shown in FIG. 11 is relatively simple in arrangement.

In the second embodiment, the temperature at which the solenoid-operated valve 101 is opened, as indicated by the line (C) in FIG. 10, the temperature at which the solenoid-operated valve 101 is closed, as indicated by the line (B) in FIG. 10, and the temperature of the atmospheric air or the temperature of the atmosphere in which the heat sink 2 is located, as indicated by the line (A) in FIG. 10 are also related to each other as follows:

(C)>(B)>(A).

Therefore, the temperature of the heat sink 2 is maintained in a range which is higher than the temperature of the atmospheric air or the temperature of the atmosphere in which the heat sink 2 is located. The temperature of the surface of the heat sink 2 is thus higher than the dew point, preventing moisture condensation on the heat sink 2 and the inverter device.

Figure 13:
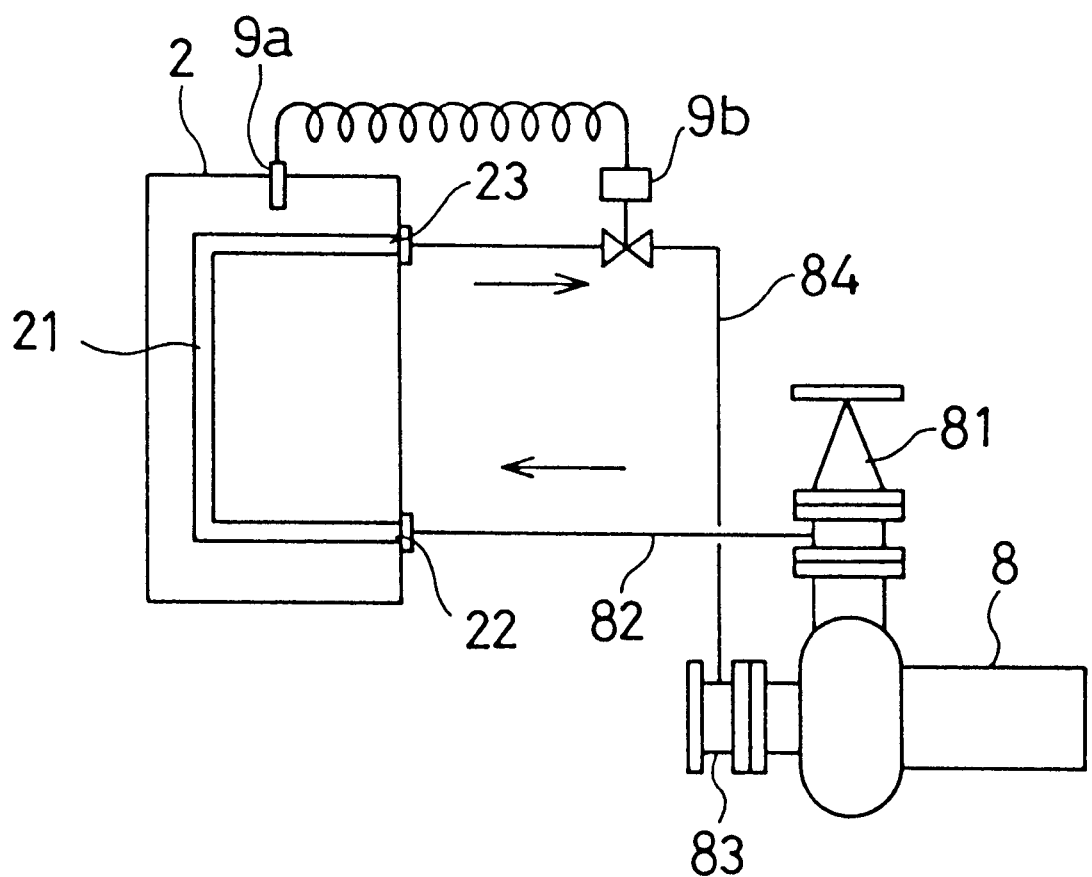
FIG. 13 is a schematic view of a liquid-cooling mechanism for cooling an inverter device, which carries out a method according to a third embodiment of the present invention.

FIG. 13 schematically shows a liquid-cooling mechanism for cooling an inverter device, which carries out a method according to a third embodiment of the present invention.

The liquid-cooling mechanism shown in FIG. 13 is similar to the liquid-cooling mechanism shown in FIG. 11 except that a temperature regulating valve comprises a heat sensitive unit 9a mounted on the heat sink 2 and a valve unit 9b for selectively opening and closing the return pipe 84 based on the temperature of the heat sink 2 as detected by the heat sensitive unit 9a. Other structural and functional details of the liquid-cooling mechanism shown in FIG. 13 are the same as those of the liquid-cooling mechanism shown in FIG. 11. The liquid-cooling mechanism shown in FIG. 13 operates in the same manner as the liquid-cooling mechanism shown in FIG. 11.

Since the heat sink 2 itself has a relatively large thermal capacity, its temperature does rot drop immediately when the cooling liquid starts to flow through the cooling pipe 21. Therefore, the heat sensitive unit 9a mounted on the heat sink 2 is prevented from being too sensitive, and hence the valve unit 9b is prevented from being opened and closed frequently.

Figure 14:
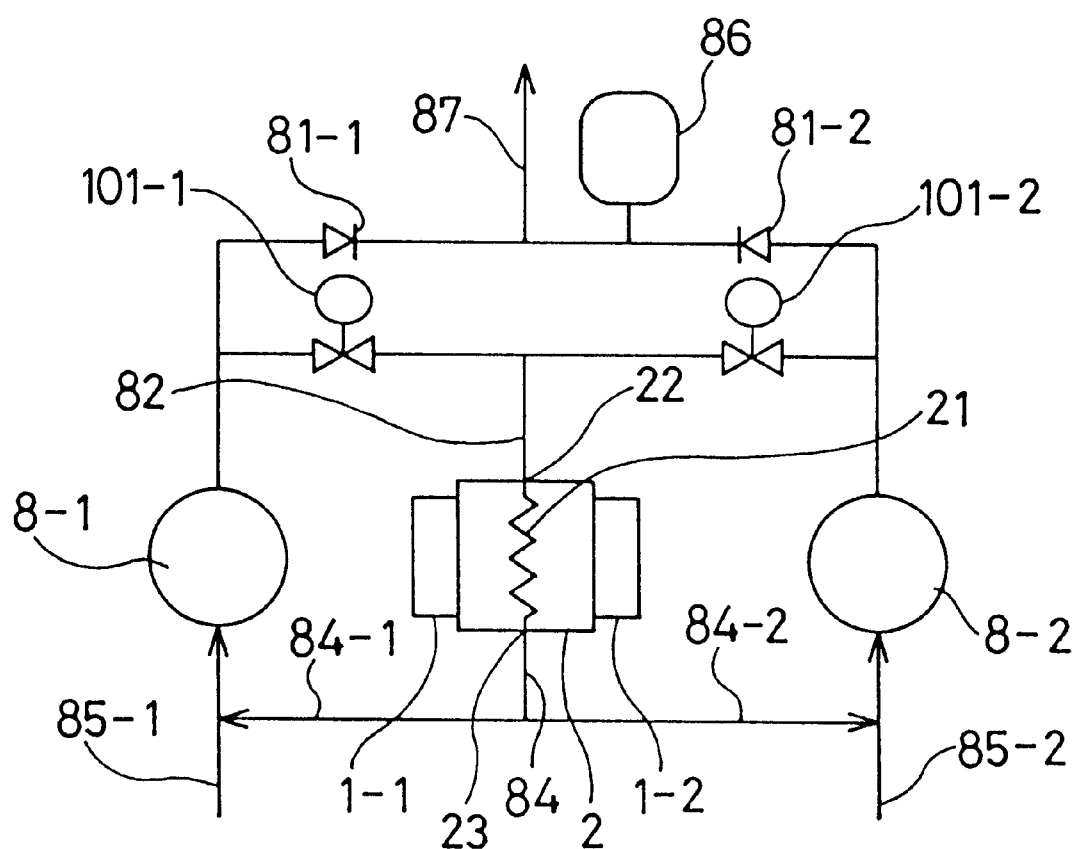
FIG. 14 is a schematic view of a liquid-cooling mechanism for cooling two inverter devices in a water supply system having two pumps.

FIG. 14 schematically shows a liquid-cooling mechanism for cooling two inverter devices in a water supply system having two pumps.

The water supply system shown in FIG. 14 is a small-size water supply facility for supplying water to a general multiple dwelling house, or the like. As shown in FIG. 14, the water supply system has a pair of pumps 8-1, 8-2, a pair of check valves 81-1, 81-2 connected to the respective outlet ports of the pumps 8-1, 8-2, a common outlet pipe 87 connected to the secondary sides of the check valves 81-1, 81-2, and a pressure tank 86 connected to the outlet pipe 87. The outlet pipe 87 is branched into branch pipes that are connected to users. The pressure of discharged water in the outlet pipe 87 is detected by a pressure sensor (not shown), and compared with a target water pressure to be discharged by the pumps 8-1, 8-2. Based on the compared result, the pumps 8-1, 8-2 are controlled by respective inverter devices 1-1, 1-2 to discharge water under a constant pressure. The small-size water supply facility for supplying water to a general multiple dwelling house, or the like, is not required to operate the pumps 8-1, 8-2 late at night because the number of users who consume supplied water is very small. In such a water consumption time zone, the pumps 8-1, 8-2 are not operated, but water is stored under pressure in the pressure tank which maintains the desired water pressure in the branch pipes connected to the users.

The inverter devices 1-1, 1-2 are mounted on opposite sides of a single heat sink 2. Part of the water discharged from the pumps 8-1, 8-2 is supplied as cooling water to an inlet port 22 of a cooling pipe 21 in the heat sink 2 from a conduit 82 connected to a junction between two solenoid-operated valves 101-1, 101-2 which are connected respectively to junctions between the outlet ports of the pumps 8-1, 8-2 and the check valves 81-1, 81-2. The cooling welter that has passed through the cooling pipe 21 flows into an outlet pipe 84 connected to an outlet port 23 of the cooling pipe 21 and then flows through return pipes 84-1, 84-2 connected to the outlet pipe 84 to inlet pipes 85-1, 85-2 which are connected respectively to inlet ports of the pumps 8-1, 8-2.

Therefore, part of the water discharged under pressure by the pumps 8-1, 8-2 can be supplied as cooling water for depriving the heat sink 2 of the heat that is generated by the inverter devices 1-1, 1-2 when they control the pumps 8-1, 8-2. While the pumps 8-1, 8-2 are not operating, even if the temperature of the heat sink 2 increases due to an increase in the ambient temperature in summer or direct exposure to sunlight, for example, thereby opening the solenoid-operated valves 101-1, 101-2, no cooling water is supplied to the heat sink 2 because the pumps 8-1, 8-2 are not operating.

Inasmuch as the inverter devices 1-1, 1-2 generate heat only when the pumps 8-1, 8-2 are operated, the cooling water is automatically supplied from the pumps 8-1, 8-2 to the heat sink 2 only when the inverter devices 1-1, 1-2 are to be cooled. However, the liquid-cooling mechanism incorporated in the water supply system shown in FIG. 14 is relatively uneconomical because as many solenoid-operated valves 101-1, 101-2 as the number of pumps are required, and a complex piping system connected to the outlet ports of the pumps 8-1, 8-2 is necessary.

Figure 15:
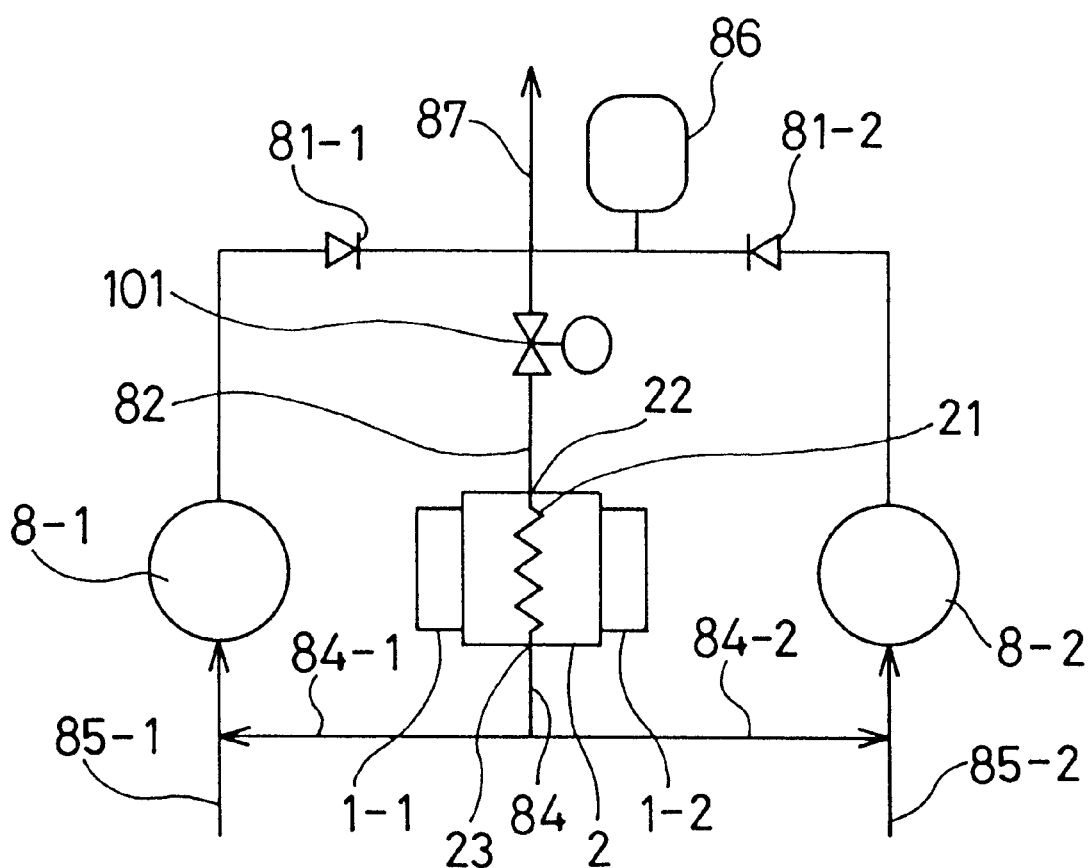
FIG. 15 is a schematic view of an improvement of the liquid-cooling mechanism shown in FIG. 14.

FIG. 15 schematically shows an improvement of the liquid-cooling mechanism shown in FIG. 14. The improved liquid-cooling mechanism shown in FIG. 15 is designed to alleviate the above drawbacks of the liquid-cooling mechanism shown in FIG. 14.

As shown in FIG. 15, the improved liquid-cooling mechanism differs from the liquid-cooling mechanism shown in FIG. 14 in that the solenoid-operated valves 101-1, 101-2 are dispensed with, and a single solenoid-operated valve 101 is connected between the outlet pipe 87 and the conduit 82.

While the pumps 8-1, 8-2 are not operating, if the temperature of the heat sink 2 increases due to an increase in the ambient temperature in summer or direct exposure to sunlight, for example, then the solenoid-operated valve 101 is opened, bringing the outlet and inlet parts of the pumps 8-1, 8-2 into communication with each other through the check valves 81-1, 81-2, the solenoid-operated valve 101, the cooling pipe 21, the outlet pipe 84, the return pipes 84-1, 84-2, and the inlet pipes 85-1, 85-2. When this happens, water stored under pressure in the pressure tank 86 returns through the solenoid-operated valve 101, the cooling pipe 21, the outlet pipe 84, the return pipes 84-1, 84-2, and the inlet pipes 85-1, 85-2 to the inlet ports of the pumps 8-1, 8-2. Accordingly, the pressure in the pressure tank 86 is lowered, causing the pumps 8-1, 8-2 to start operating. When the pumps 8-1, 8-2 operate, the pressure in the pressure tank 86 is increased, and cooling water is supplied to the cooling pipe 21 to lower the temperature of the heat sink 2. In this manner, the pumps 8-1, 8-2 will repeatedly be operated and stopped.

To avoid the above shortcoming, the solenoid-operated valve 101 is opened only when the temperature of the heat sink 2 is higher than a preset temperature and the pumps 8-1, 8-2 are operating, and is closed only when the temperature of the heat sink 2 is lower than the preset temperature or the pumps 8-1, 8-2 are inactivated. If the solenoid-operated valve 101 is thus controlled, the pumps 8-1, 8-2 will not be repeatedly operated and stopped. The liquid-cooling mechanism shown in FIG. 15 is relatively economical as the single solenoid-operated valve 101 can control the supply of the cooling water to the heat sink 2 even through the two pumps 8-1, 8-2 are employed.

In the liquid-cooling mechanisms shown in FIGS. 14 and 15, the temperature at which the solenoid-operated valve or valves are opened, the temperature at which the solenoid-operated valve or vales are closed, and the temperature of the atmospheric air or the temperature of the atmosphere in which the heat sink 2 is located are related to each other as shown in FIG. 10. However, since the allowable temperature for the power semiconductor devices of the inverter device has a certain limit, the temperature settings shown in FIG. 10 may not be allowed if the temperature of the atmospheric air or the temperature of the atmosphere in which the heat sink 2 is located is relatively high.

Figure 16A:
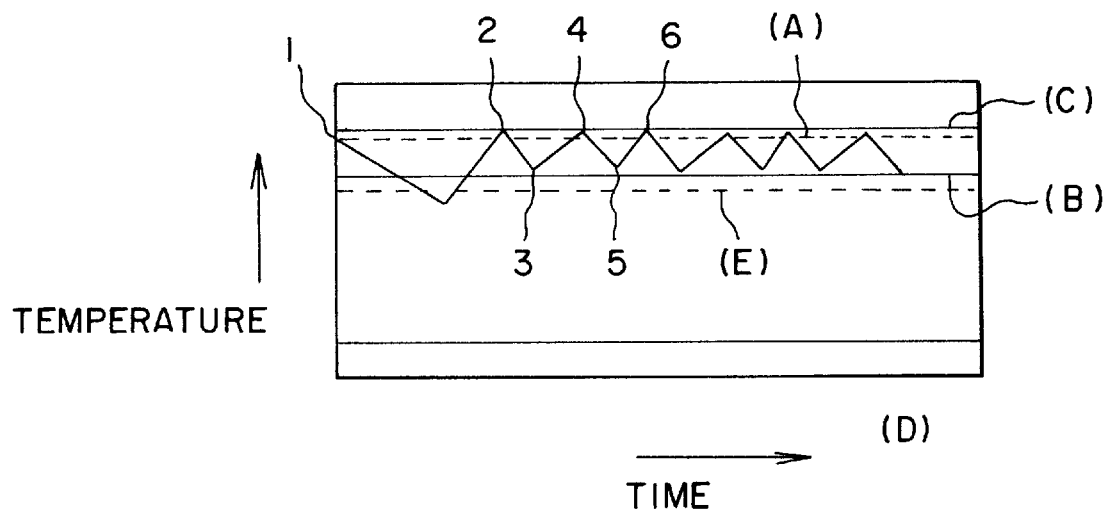
FIGS. 16A and 16B are diagrams showing other temperature patterns in which the temperature of a heat sink varies with time in response to operation of a solenoid-operated valve.

If the temperature of the atmospheric air or the temperature of the atmosphere in which the heat sink 2 is located is relatively high, as shown in FIG. 16A, then the temperature at which the solenoid-operated valve 101 is closed, as indicated by the line (B), may be lower than the temperature at which the solenoid-operated valve 101 is opened, as indicated by the line (C), and slight y higher than the temperature of the dew point of the atmospheric air or the temperature of the atmosphere in which the heat sink 2 is located, as indicated by the line (E). Therefore, even when the temperature of the heat sink 2 drops below the temperature of the atmospheric air or the temperature of the atmosphere in which the heat sink 2 is located, since the temperature of the heat sink 2 is higher than the dew point, no moisture condensation takes place on the heat sink 2 and the inverter device.

Figure 16B:
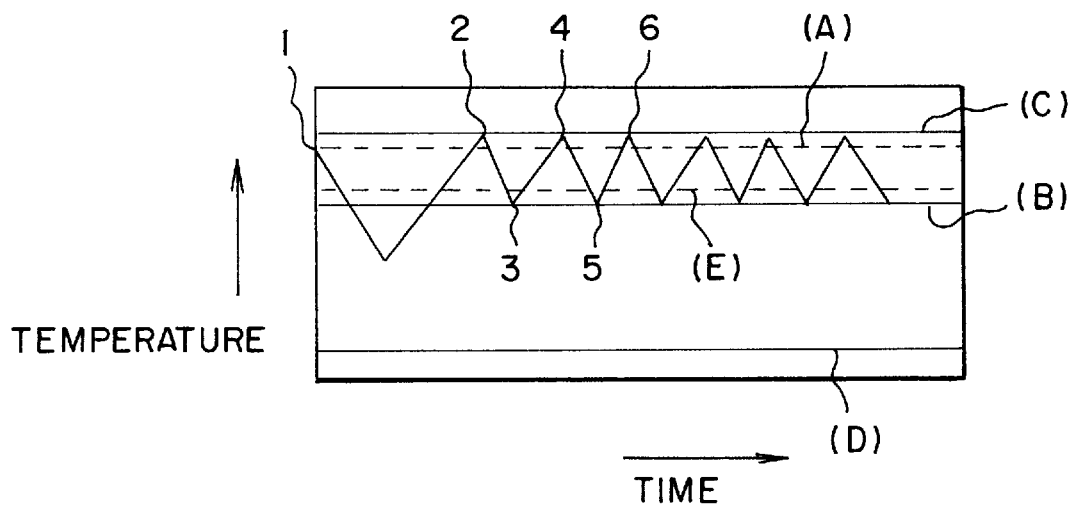

As shown in FIG. 16B, the temperature at which the solenoid-operated valve 101 is closed, as indicated by the line (B), may be slightly lower than the dew point, as indicated by the line (E), with an allowable relative moisture at the temperature of the atmospheric air or the temperature of the atmosphere in which the heat sink 2 is located. According to the temperature pattern shown in FIG. 16B, when the temperature of the heat sink 2 drops below the dew point, localized moisture condensation occurs on the heat sink 2 and the inverter device. However, the produced dew can quickly be evaporated when the inverter device is heated again. If any moisture condensation should not be allowed, then areas of the heat sink 2 and the inverter device where the moisture tends to be condensed should be protected by a heat insulating material. The temperature pattern shown in FIG. 16B permits the temperature at which the solenoid-operated valve 101 is opened, as indicated by the line (C), and the temperature at which the solenoid-operated valve 101 is closed, as indicated by the line (B), to differ widely apart from each other. Therefore, the solenoid-operated valve or valves are prevented from being opened and closed frequently, and hence have an extended service life.

Figure 17A:
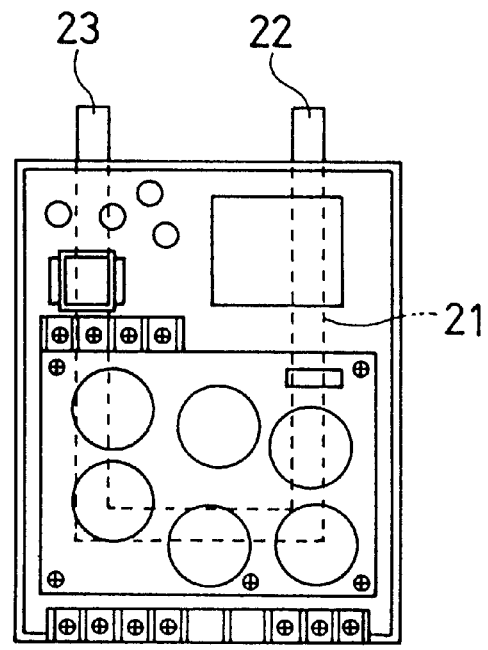
FIG. 17A is a front elevational view of two inverter devices mounted on a single heat sink for being cooled by a liquid-cooling mechanism.
Figure 17B:
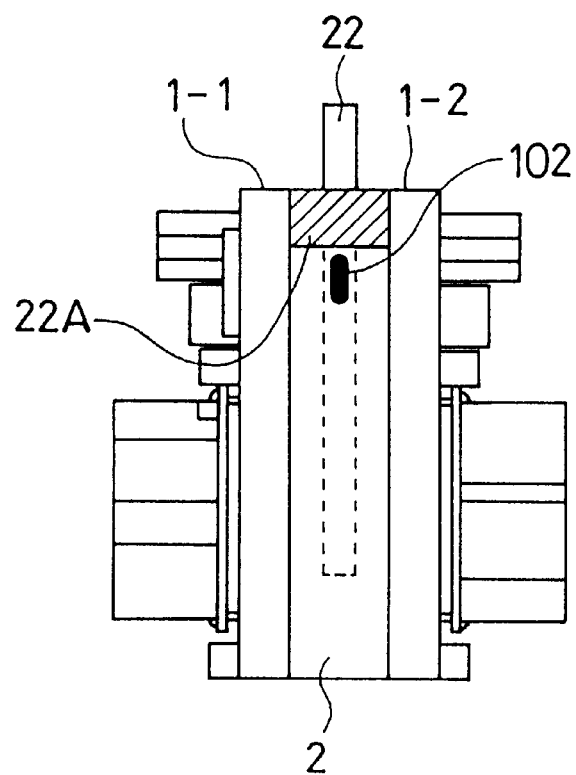
FIG. 17B is a side elevational view of the two inverter devices mounted on the single heat sink shown in FIG. 17A.

FIGS. 17A and 17B show two inverter devices mounted on a single heat sink for being cooled by a liquid-cooling mechanism according to the temperature pattern shown in FIG. 16B. As shown in FIGS. 17A and 17B, two inverter devices 1-1, 1-2 are mounted on the respective opposite sides of a single heat sink 2, and a temperature sensor 102 is installed in a position spaced from power transistor devices of the inverter devices 1-1, 1-2 which serve as a heat source. With the cooling pipe 21 extending through the heat sink 2 as shown in FIG. 17A, if the temperature at which the solenoid-operated valve 101 is closed, as indicated by the line (B), is slightly lower than the dew point, as indicated by the line (E), with an allowable relative moisture at the temperature of the atmospheric air or the temperature of the atmosphere in which the heat sink 2 is located, then the moisture is condensed on an area 22A (shown hatched in FIG. 17B) near the inlet port 22 of the cooling pipe 21 in the heat sink 2.

Figure 18:
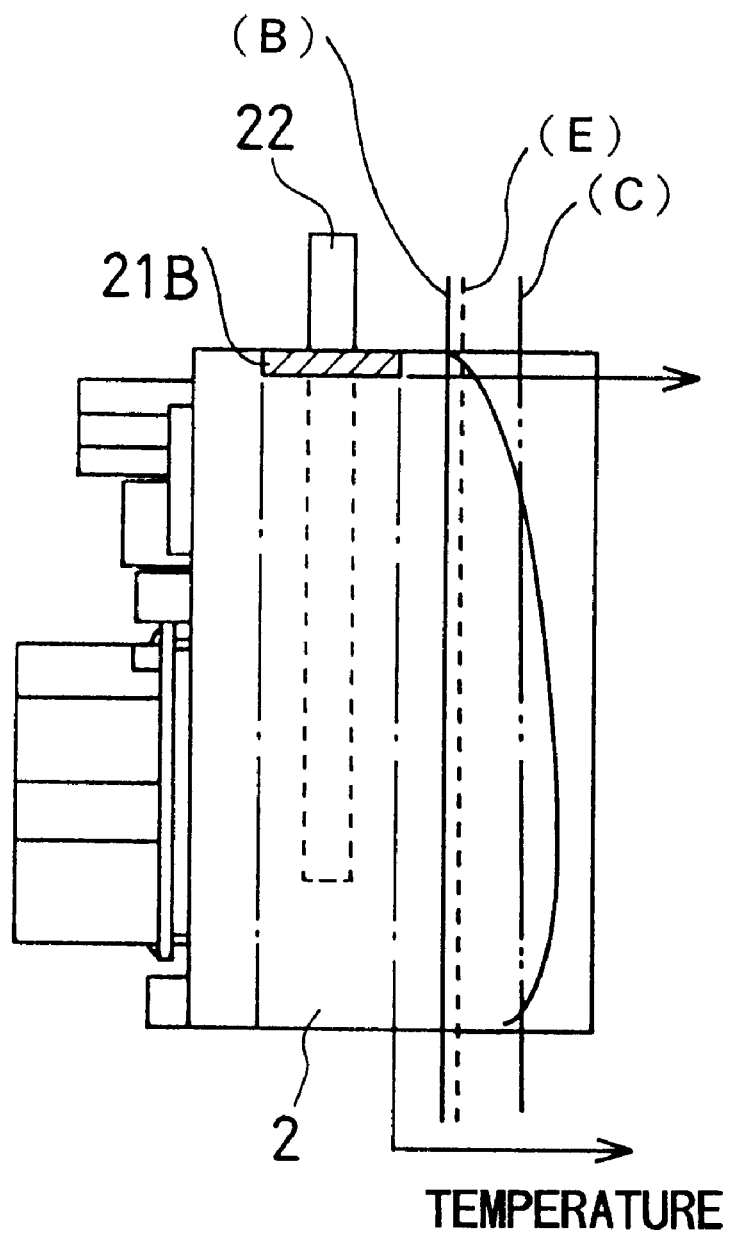
FIG. 18 is a side elevational view showing a temperature distribution on the inverter devices shown in FIGS. 17A and 17B.

As shown in FIG. 18, the temperature distribution over the heat sink 2 is such that the temperature is highest in the vicinity of the center of the heat sink 2 and the power semiconductor devices in the inverter devices, and is progressively lower in a direction away from the center of the heat sink 2 and the power semiconductor devices. Because the inlet port 22 is positioned most remotely from the power semiconductor devices and directly affected by the temperature of the cooling water, the temperature of an area 21B (shown hatched in FIG. 18) near the inlet port 22 tends to be lowered below the dew point when the temperature of the upper surface of the heat sink 2 drops from the temperature at which the solenoid-operated valve 101 is opened, as indicated by the line (C), to the temperature at which the solenoid-operated valve 101 is closed, as indicated by the line (B). To avoid moisture condensation on the area 21B, a heat insulating material is attached to the area 21B. The heat insulating material does not adversely affect the absorption by the heat sink 2 of the heat of the inverter devices because the temperature of the area 21B is relatively low due to its being positioned closely to the inlet port 22.

In the illustrated embodiments, the solenoid-operated valve or valves and the temperature regulating valve are opened at a certain temperature and closed at another certain temperature. However, these valves may be continuously adjusted in their opening depending on the temperature detected by the temperature sensor or the heat sensitive unit.

Although certain preferred embodiments of the present invention have been shown and described in detail, it should be understood that various changes and modifications may be made therein without departing from the scope of the appended claims.

What is claimed is:

1. A method of cooling an inverter device mounted on a heat sink with a cooling liquid discharged by a plurality of pumps controlled by the inverter device, comprising the step of:

regulating the rate of flow of the cooling liquid supplied from a common passage connected to outlet ports of the pumps to the heat sink with a flow regulating mechanism which is opened only when the temperature of the heat sink is higher than a preset temperature and the pumps are operating, and is closed only when one of the temperature of the heat sink is lower than the preset temperature and the pumps are inactivated.

2. A method of cooling an inverter device mounted on a heat sink with a cooling liquid, comprising the steps of:

flowing cooling liquid through the heat sink;

controlling a flow of said cooling liquid supplied to the heat sink by means of a flow regulating mechanism;

monitoring a temperature of the heat sink by a temperature detecting device mounted on said heat sink; and regulating a rate of flow of the cooling liquid supplied to the heat sink by the flow regulating mechanism based on the temperature of the heat sink detected by the temperature detecting device, thereby keeping the temperature of the heat sink in a predetermined range, wherein said temperature detecting device comprises a heat sensitive unit which stores a substance contractible and expandable with heat, said heat sensitive unit being mounted on said heat sink, and said heat sensitive unit comprises a temperature regulating valve which is selectively openable and closable based on the contraction and expansion of said substance.

3. A method according to claim 2, wherein said heat sensitive unit is disposed in a flow passage of the cooling liquid which is connected to said heat sink.

4. A method of cooling an inverter device mounted on a heat sink with a cooling liquid, comprising the steps of:

flowing cooling liquid through the heat sink, said cooling liquid being discharged by a pump which is controlled by said inverter device;

supplying part of said cooling liquid discharged by the pump from a junction between an outlet port of the pump and a check valve connected thereto to said heat sink, and returning the cooling liquid from said heat sink to said pump;

controlling the flow of cooling liquid supplied to the heat sink by means of a flow regulating mechanism;

monitoring the temperature of the heat sink by a temperature detecting device mounted on said heat sink; and regulating the rate of flow of the cooling liquid supplied to the heat sink by the flow regulating mechanism based on the temperature of the heat sink detected by the temperature detecting device, thereby keeping the temperature of the heat sink in a predetermined range, wherein said temperature detecting device comprises a heat sensitive unit which stores a substance contractible and expandable with heat, said heat sensitive unit being mounted on said heat sink, and said heat sensitive unit comprises a temperature regulating valve which is selectively openable and closable based on the contraction and expansion of said substance.

5. A method according to claim 4, wherein said heat sensitive unit is disposed in a flow passage of the cooling liquid which is connected to said heat sink.

\* \* \* \* \*